United States Patent [19]

Krein et al.

[11] Patent Number: 5,028,197
[45] Date of Patent: Jul. 2, 1991

[54] METHOD AND APPARATUS FOR SECURING A WATER PROOF LINER TO THE WALLS OF A CONTAINER

[75] Inventors: Reuben J. Krein; Jeffrey L. Smith, both of Fort Smith, Ark.

[73] Assignee: BJK Industries, Inc., Fort Smith, Ark.

[21] Appl. No.: 400,332

[22] Filed: Aug. 30, 1989

Related U.S. Application Data

[63] Continuation-in-part of Ser. No. 385,243, Jul. 25, 1989, which is a continuation of Ser. No. 241,770, Sep. 7, 1988, Pat. No. 4,863,339, which is a continuation of Ser. No. 863,093, May 14, 1986, abandoned, which is a continuation-in-part of Ser. No. 733,962, May 14, 1985, Pat. No. 4,671,733, which is a continuation-in-part of Ser. No. 502,696, Jun. 9, 1983, Pat. No. 4,516,906.

[51] Int. Cl.$^5$ .................................................. B65D 88/12
[52] U.S. Cl. .................................. 414/467; 414/373; 414/572; 414/786; 220/461; 220/403; 220/404; 222/105; 403/403
[58] Field of Search ............... 414/786, 572, 373, 293, 414/348, 467; 406/38; 222/105; 220/403, 85 B, 410, 461, 462, 463, 413, 400; 296/37, 39 R; 403/403, 382, 205; 24/460

[56] References Cited

U.S. PATENT DOCUMENTS

| Re. 29,721 | 8/1978 | Ukmar et al. | 220/403 X |
| 2,206,421 | 7/1940 | Muehlhofer | 220/404 X |
| 2,696,339 | 12/1954 | Bergstrom | 220/404 X |
| 3,648,875 | 3/1972 | Lundgren | 220/410 X |
| 3,648,882 | 3/1972 | Shelton | 220/462 X |
| 3,696,952 | 10/1972 | Bodenheimer | 414/412 X |
| 4,715,572 | 12/1987 | Robbins, III et al. | 220/17 X |

FOREIGN PATENT DOCUMENTS 6911892  6/1970  Netherlands ........................ 414/467

Primary Examiner—Frank E. Werner
Attorney, Agent, or Firm—Ross, Howison, Clapp & Korn

[57] ABSTRACT

A liner installation device includes a liner (16) for being disposed in a container (10). A manifold (24) is operable to be disposed at the peripheral opening of the container (10) and be connected to a vacuum source (22) through a hose (26). A retaining member (34) comprised of a retaining bracket (36) and a securing bar (38) operable to be disposed in the container (10). The retaining bracket (36) is disposed along the upper corners of the container (10). The liner (16) is then laid into the bottom of the container (10). After the liner (16) is disposed in the container (10), the peripheral edges thereof are held against the peripheral edges of the container (10). A vacuum is pulled on the spacer between the interior surfaces of the container (10) and the exterior surfaces of the liner (16). After the exterior surfaces of the liner (16) are proximate to the interior surfaces of the container (10), the securing bar (38) is disposed in the recess between grooves (44) (46) such that the parallel edges (40) (42) of the securing bar (38) are disposed therein and hold the liner (16) therebetween.

17 Claims, 8 Drawing Sheets

METHOD AND APPARATUS FOR SECURING A WATER PROOF LINER TO THE WALLS OF A CONTAINER

CROSS REFERENCE TO RELATED APPLICATIONS

This application is a continuation-in-part of Patent Application Ser. No. 385,243, filed July 25, 1989, which is a continuation of Patent Application Ser. No. 241,770, filed Sept. 7, 1988, now U.S. Pat. No. 4,863,339, which is a continuation of Patent Application Ser. No. 863,093, filed May 14, 1986, now abandoned, which is a continuation-in-part of Patent Application Ser. No. 733,962, filed May 14, 1985, now U.S. Pat. No. 4,671,733, which is a continuation-in-part of Patent Application Ser. No. 502,696, filed June 9, 1983, now U.S. Pat. No. 4,516,906 issued on May 14, 1985.

TECHNICAL FIELD OF THE INVENTION

The present invention pertains in general to waterproof liner installation systems for cargo containers and, more particularly, to a liner installation system utilizing only vacuum.

BACKGROUND OF THE INVENTION

The basic concept of providing a semi-truck trailer with a liner and ancillary support equipment has been generally proposed in the past for various reasons. For example, in U.S. Pat. No. 2,712,797 a bag like flexible container is disclosed mounted in a dump truck trailer wherein supporting means for collapsing the flexible container is provided such that the trailer can be used for bulk haulage of pourable material as well as for general hauling. U.S. Pat. No. 3,756,469 discloses a flexible liner used in a hopper vehicle, again where the flexible liner is supported within the trailer such that it is collapsible, allowing the trailer to be converted to general hauling. Other specialized applications for open topped trailer liners have been proposed such as in U.S Pat. No. 4,186,845 wherein a foamed base sheet with polymeric top sheet is proposed for creating a tub within a trailer and U.S. Pat. Nos. 3,980,196 and 4,124,136 disclose flexible liners with framework and bulk head that essentially convert the trailer into a container for bulk cargo transport. Similarly, U.S. Pat. No. 3,951,287 discloses a flexible liner that is supported within a conventional semi-trailer by stretchable connectors along the trailer sidewalls that essentially convert the trailer to bulk material shipping.

In contrast to the prior art concept of using a flexible liner for bulk handling, theoretically there are other applications for use of a liner within a trailer provided such liner would be relatively inexpensive, be readily and conveniently installed without essentially any down time or significant additional labor costs and provided that no other significant health hazard or risk is associated with its use. For example, it is known and generally tolerated in the trailer industry that certain types of common and ordinary goods statistically incur significant water damage associated with conventional transportation procedures independent of continuing efforts to prevent such shipping damage. In particular, moisture damage to cigarette and other tobacco products during transportation is known to be a troublesome problem in the industry, as is moisture and water damage to various paper products and paper related articles directly attributable to leaks in the semi-trailer. Although damages associated with such occurrences can be considered a significant statistical risk and cost from an insurance industry viewpoint, the actual effectiveness of correcting the problem by conventional methods (e.g., better packaging, sealing leaks in the trailer, etc.) is cost prohibitive relative to insuring the risk.

Another problem that exists with the present liner installation systems is securing a liner once it has been installed. Some individuals have utilized a glue of some sort that is either sprayed onto the sides of the container or onto the liner itself when the liner is placed up against the walls of the container. This allows some securing thereof. Thereafter, no additional exterior force is required in order to maintain the liner in close contact with the walls of the container. This therefore allows merchandise or the such to be loaded into the lined container. However, it is very difficult to manipulate a liner with this type of securing device, as the glue may prematurely touch the liner which requires it to be pulled away from the wall and adjusted, thus hindering the installation of the liner.

One reason that it is important to have the liner secured against the walls of the container prior to loading the lined container is that it is sometimes desirable to install the liner in one location and ship the lined container to another location for loading There is no present installation system that solves the above problems and, therefore, there exists a need for a method to install a liner in the container that will allow the container to be shipped from one location to the other with the liner intact.

SUMMARY OF THE INVENTION

The present invention disclosed and claimed herein discloses a method for installing a liner in a container. The liner has at least one open end and the container has at least one open end. An plurality of interlocking devices are provided, each having first and second interlocking sections that are operable to be mated together in a locking configuration. The first interlocking sections are disposed on the interior walls of the container at select locations and adhered to there. The liner is then inserted into the opening of the container such that at least one opening in the liner is proximate to the opening of the container. The walls of the liner are then urged outward and against the interior walls of the container and the first interlocking sections. The second interlocking section is then interlocked with the first interlocking section with the liner disposed therebetween, such that they are able to remain in the locking configuration.

In another aspect of the present invention, the walls of the liner are urged upward by first sealing the peripheral opening of the liner proximate to the peripheral opening of the container to form an interior space between the interior walls of the container and the exterior surface of the liner. A passageway is formed between the interior space and the exterior of the container. Air is pulled through the passageway from the interior space to create a vacuum therein such that the vacuum pulls the exterior surface of the liner against the interior walls of the container. Thereafter, the vacuum is removed from the interior space.

In yet another aspect of the present invention, the container is moved to a different location after installation of the liner, and cargo loaded therein. After loading of the cargo, the at least one opening in the container is pulled down over the cargo and a seal provided therefore.

In a further aspect of the present invention, the interlocking sections are comprised of the male/female locking device. One side of the male/female locking device is adhered to the interior walls of the container by either a layer of adhesive or by bolts. The other side of the male/female interlocking device is then urged into a locking relationship with the one side thereof after the liner is urged up against the interior walls of the container, the interlocking relationship of the male/female interlocking device not puncturing the liner. In one embodiment, there are a plurality of male/female interlocking devices provided and disposed along the upper corners of the container, which is rectangular in shape. In a second embodiment, the male/female interlocking devices are disposed in the lower corners of the container.

BRIEF DESCRIPTION OF THE DRAWINGS

For a more complete understanding of the present invention and the advantages thereof, reference is now made in the following description taken in conjunction with the accompanying Drawings in which.

DETAILED DESCRIPTION OF THE INVENTION

Figure 1:
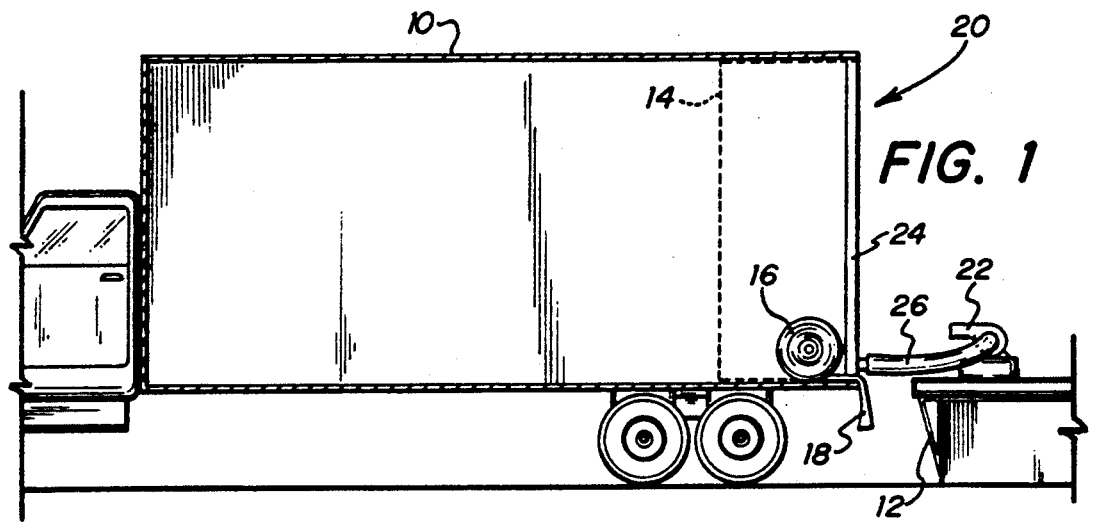
FIGS. 1 through 3 illustrate partial cross-sectional views illustrating the sequential steps associated with the method of the present invention for placing a stand-alone, moisture proof liner in a semitrailer.

The method of installing a waterproof liner according to the present invention can perhaps be best explained and understood by reference to the drawings. FIG. 1 illustrates a conventional semi-tractor trailer 10 backed up to a loading dock 12 with rear doors 14 of the trailer 10 opened for installation of the liner 16. As illustrated, liner 16 is initially in a deflated state and, in this embodiment, rolled up in a tight coil. The liner 16 is essentially a large plastic bag or inflatable bladder wherein the opening 18 of the liner is positioned at the doorway 20 of the trailer. The liner is then unrolled or unfolded and stretched out such that it extends along the floor of the trailer and the open end of the bag extending out the doorway. An air blower 22 is positioned on the dock 12 and directed toward the back of the trailer 10 such as to be turned on later when inflating the liner 16.

Figure 7:
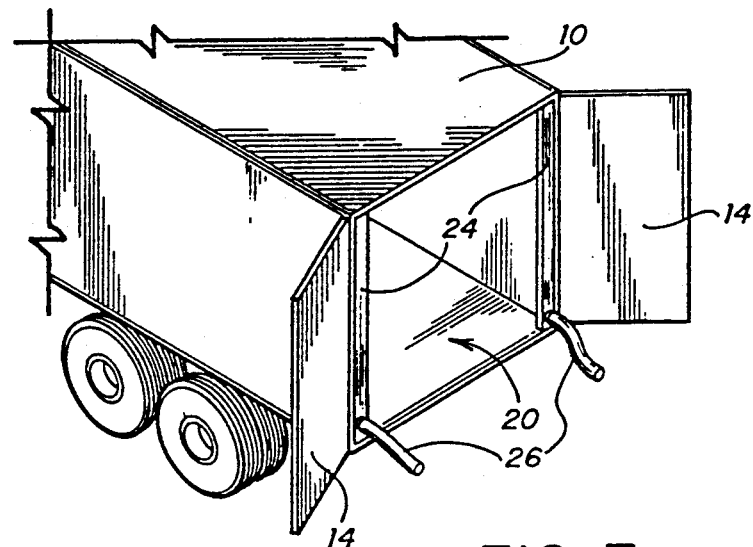
FIG. 7 illustrates vacuum assist equipment installed in a semi-trailer before inflation of the liner.

Also, a pair of vertical vacuum tubes 24 (see FIG. 7) are inserted on the interior of the sidewalls at the rear of the semi-trailer near the hinged portion of the door 14. Each of the vacuum tubes 24 are connected via flexible hoses 26 to the suction side of blower 22. It should be appreciated that other physical configurations, equipment and methods of applying suction to the interior of the trailer or cargo container between the plastic liner and the container sidewalls can be employed in the present invention. As such, various suction tubes or other air channels can be readily incorporated into the present invention, including by way of example, but not limited thereto, horizontal tubes extending from the door of the trailer back into the rear of the container, air channels built into the sidewalls of the cargo container or trailer, horizontal suction tubes along the top and/or bottom of the doorway, and the like. It should be further appreciated that the vacuum tubes 24 of the drawing as well as any equivalent structure according to the present invention should be perforated (not shown) along the device such as to withdraw air potentially trapped between the expanding plastic liner and the sidewalls confining the liner.

Figure 2:
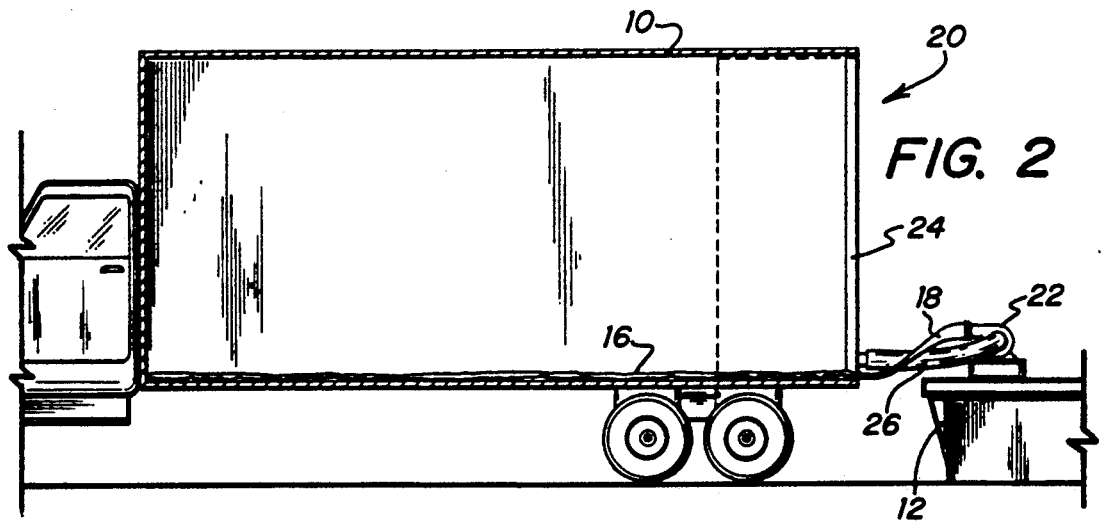

FIG. 2 illustrates liner 16 fully extended in the trailer 10 with the liner opening 18 being mounted directly to the air outlet side of the blower 22. Various alternative methods of attaching the liner 16 to the air supply can be employed. Thus, the opening 18 can be connected directly to the blower outlet as illustrated or can be attached to various types of nozzles, connectors or the like which in turn are fed air from a blower, air manifold or even compressed gas cylinder or other equivalent source. Similarly, it is envisioned that the vacuum tubes 24 can be physically attached through various types of nozzles, connectors, or the like, to any appropriate vacuum source, including the inlet side of the blower, or other equivalent low pressure device or equipment.

Figure 3:
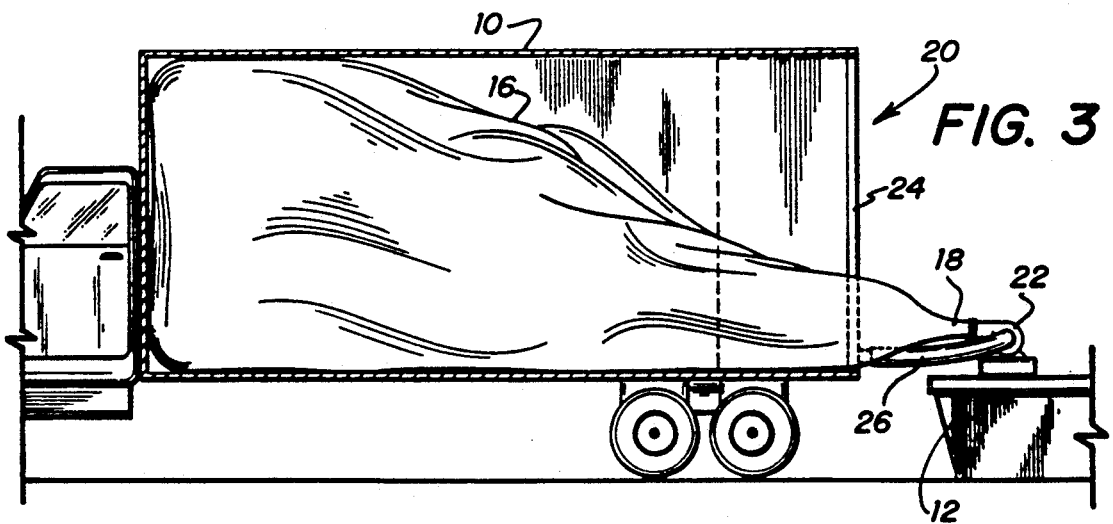

Having secured the opening 18 of the liner 16 to the blower 22, the blower 22 is then turned on and gentle stream of air is directed into the liner 16. The air is selectively directed to the front of the trailer 10 (see FIG. 3) such that the liner 16 inflates to the ceiling of the trailer in the front portion of the trailer first. The blower 22 continues to gradually fill the liner 16 from the front of the trailer to the rear of the trailer. To assist in this critical inflation step, tension can be selectively applied to the upper surface of the liner 16 by manually pulling downward and outward on the upper edge of the liner opening 18, if necessary. Experience indicates that if the liner 16 is not inflated from the front to the rear, thus systematically displacing any trapped air behind the bag, the entire liner 16 will tend to exit the trailer during the inflation step. Experience further indicates that when applying sufficient suction to the region between the liner 16 and the confining sidewalls as the liner 16 inflates, the tendency of the liner 16 inside the trailer to be forced out of the trailer is significantly reduced.

In view of the above step, it is also critical that the dimensions of the liner 16 be selected such that it will fit the entire interior of the trailer. Preferably, the liner 16 is a cylindrically shaped bladder having a diameter slightly greater than the larger of the width or height of the inside of the trailer.

Figure 4:
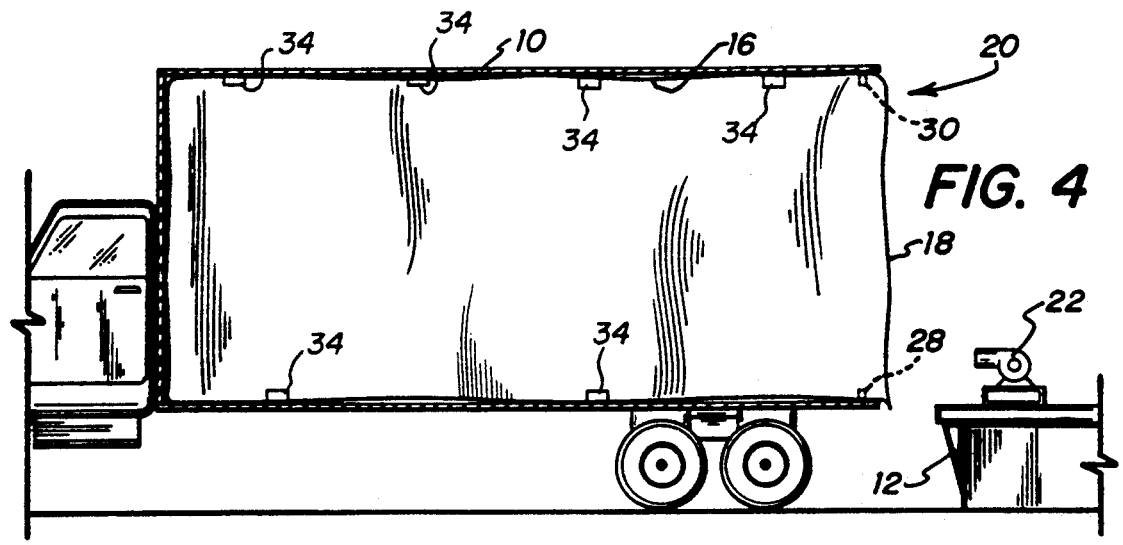
FIGS. 4 and 5 illustrate the free standing waterproof liner fully installed and ready for loading of the trailer.
Figure 5:
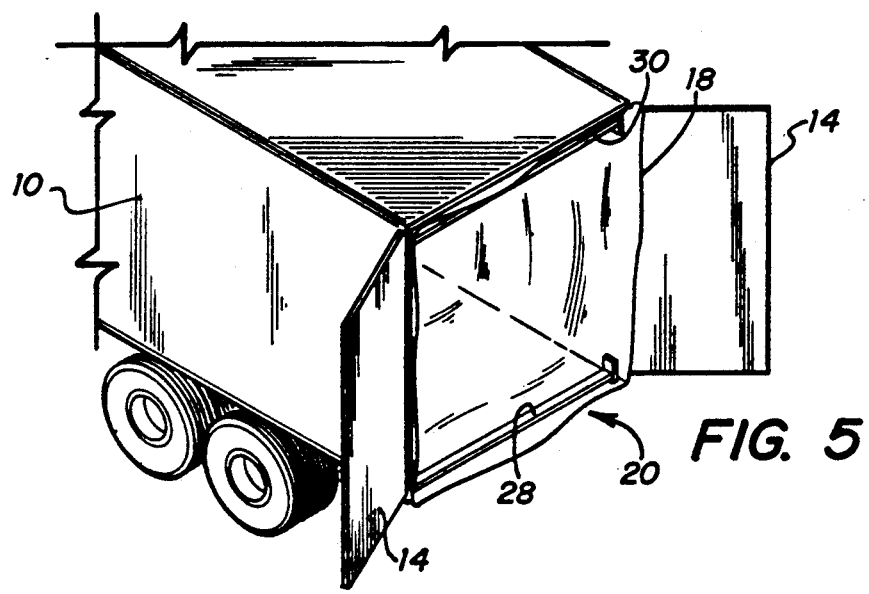
Figure 6:
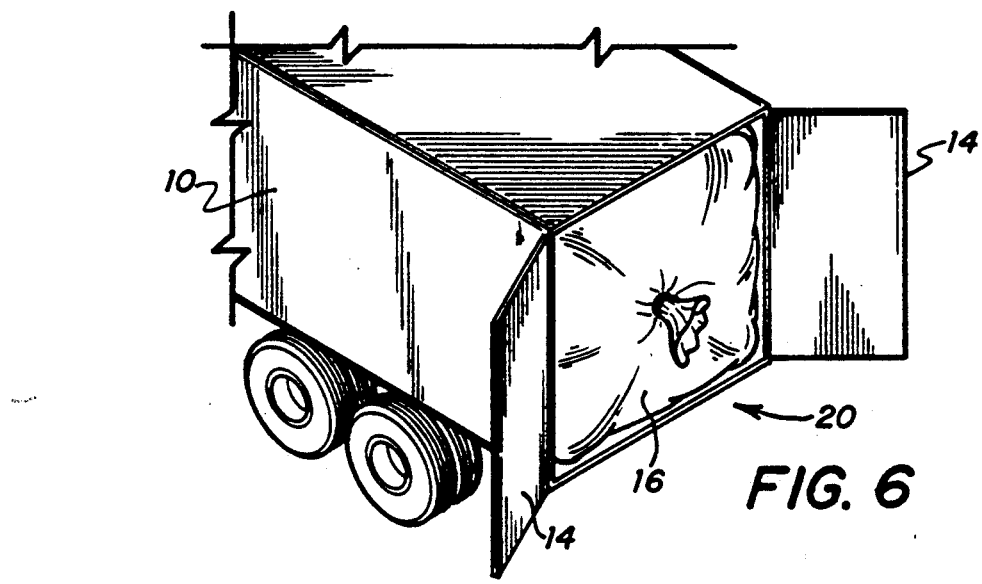
FIG. 6 illustrates the moisture proof liner sealed around the cargo of a loaded trailer.

As illustrated in FIGS. 4 and 5, once the liner 16 is fully inflated, the opening 18 can be removed from the air source and the liner 16 can be attached to the perimeter of the trailer doorway 20. In the specific embodiments of the drawing, the tension bars 28 and 30 are used to temporarily seal the bag opening 18 at the trailer doorway 20. Continued application of suction is an acceptable alternative to the use of tension bars. Also, any temporary sealing or fastening means or method well known in the art can be employed to temporarily attach the liner 16 to the doorway. The trailer is now ready to be loaded in a conventional manner. During loading, the blower may also remain in operation. However, the liner 16 once correctly inflated and sealed at the trailer doorway tends to remain in an inflated state for a considerable period of time, even without air or suction assist. After loading the cargo into the trailer, the blower is turned off and the excess liner material is wrapped around the end of the cargo and sealed such as to insure a moisture proof enclosure surrounding the entire cargo (see FIG. 6).

As previously stated, the liner 16 or inflatable protective bladder of the present invention is preferably a thin polymeric film bag of sufficient size to make contact upon inflation with the entire interior of the enclosure. It is contemplated that the liner 16 can be made of any of the conventional film grade polymeric compositions, including by way of example, but not limited thereto, polyolefins such as high density polyethylene, low density polyethylene, polypropylene and blends thereof, film grade vinyl polymers as well as natural polymeric materials such as cellulose type film. The class of polymeric film compositions that has been found to be particularly useful in the manufacturing of the plastic liner are the film grade blends of high density polyethylene with low density polyethylene. The liner 16 is contemplated as being capable of being fabricated from a series of polymeric strips or sheets which are adhesively bonded or heat sealed along longitudinal seams to each other to form the liner 16. The liner 16 can also be extruded in a single sheet or cylindrical tube provided an extrusion die of sufficient size is available. If longitudinal pieces are to be sealed together to make the bag, the use of a thicker film for the floor, along with color pigmentation and non-slip additives to identify the floor versus the sidewalls can be incorporated into the construction of the liner 16. Experience indicates that when polyolefins such as polyethylene blends are used, the liner 16 can be made out of a relatively thin film. A 2-mil polyethylene film has been successfully tested under conventional interstate commerce transportation conditions and has proved to be quite adequate for purposes of this invention. In fact, such liners have exhibited the ability to be reused if desired, but the inexpensive nature of the thin film would not necessitate reuse and is highly suggestive of disposing of the liner after one shipment.

The actual time, effort and equipment employed to install the liner is surprising nominal. Under conventional semi-trailer dock loading procedures and environment, the time required to actually inflate the liner 16 has been measured to be as short as three minutes. The procedure employed during this observation was essentially as illustrated in the drawing and involved air movement equivalent to that produced by a conventional air blower or air fan.

The use of polyolefin film liners of the present invention is particularly useful to protect tobacco products, paper products, foods and drugs, as well as other highly moisture sensitive cargo. The liners are also useful in shipping cargo that require ultra clean or an uncontaminated environment and could also be readily adapted to be used to maintain an inert vapor phase or gaseous environment. It is envisioned that the method of installing the film liner can be advantageously employed in semi-trailers, cargo containers or generally any equivalent transportation or storage facility wherein an inexpensive, throw-away plastic liner would be appropriate.

Figure 8:
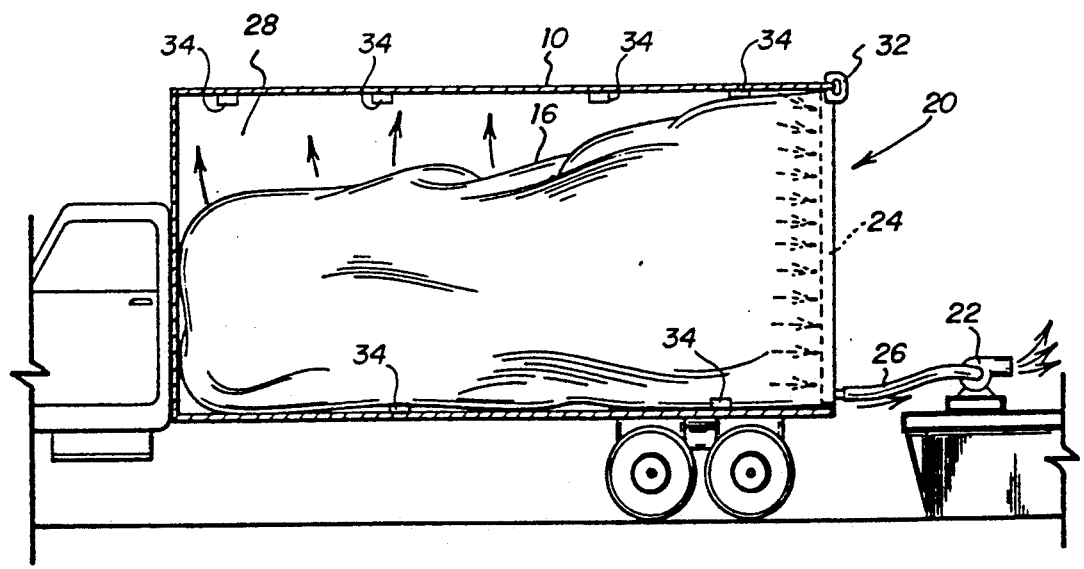
FIG. 8 illustrates the method of the present invention utilizing only vacuum assist inflation of the liner.

Referring now to FIG. 8, there is illustrated an alternate method for practicing the invention. The blower 22 is operated such that it only draws a vacuum through hose 26 from the vacuum tubes 24. These vacuum tubes 24 in the preferred embodiment draw a vacuum along the sides of the interior of the trailer to evacuate a space 28 between the bag 16 and the trailer body 10 The trailer body 10 is essentially a semi-sealed enclosure such that a negative pressure is created in space 28 when a vacuum is drawn through hose 26 by blower 22. The vacuum or negative pressure in space 28 causes the bag 16 and the surfaces thereof to raise upward against the sides of the trailer body 10 due to atmospheric pressure existing on the interior of the bag 16. In order to provide a sufficient seal for space 28, the edges of the bag 16 proximate to the periphery of the trailer are attached by clamps 32 to the edge of the trailer. The clamps are any type of C-type clamp which can grip the edge of the peripheral rim of the trailer.

In operation, the bag is first laid out in the conventional manner, as described above, in the trailer and then the peripheral edge at the opening of the bag is attached to the peripheral edge of the trailer opening. These edges are then clamped to provide a seal and then the blower 22 is turned on to produce a negative pressure in space 28. This causes the sides of the bag 16 to rise upward against the inside surfaces of the tailer body 10. However, it is not necessary for the bag to actually touch all sides of the trailer. It is therefore unnecessary to have the air blowing in the interior of the bag to create a positive pressure on the inner surfaces and therefore, the operation is significantly simplified.

Referring further to FIGS. 4 and 8, retaining members 34 are disposed along the upper edge in the corner of the container 10 on the inside thereof and spaced apart approximately four to eight feet. If necessary, a retaining members 34 is disposed on the bottom corner on either side thereof. The purpose of the retaining member 34 is to allow the motor 22 to be removed after inflation thereof.

In operation, the retaining members 34 are either integrally formed with the container 10 or they are placed into the container 10 prior to insertion of the liner 16. The individual retaining member 34, as will be described hereinbelow, is comprised of two portions, a first portion being adhered to or integrally formed with the interior of the container 10 and a second portion for securing the liner 16 to the first portion. Therefore, the first portion is adhered to the interior of the container 10 and the liner installed therein. The second portion of the retaining member 34 is then installed without puncturing the liner 16, thus securing the liner 16 to the interior walls of the container 10. This therefore allows the container 10 and the moved liner 16 to be installed to a different location for loading. Without the use of the retaining member 34, the liner 16 would collapse when the motor 22 is removed.

Figure 9:
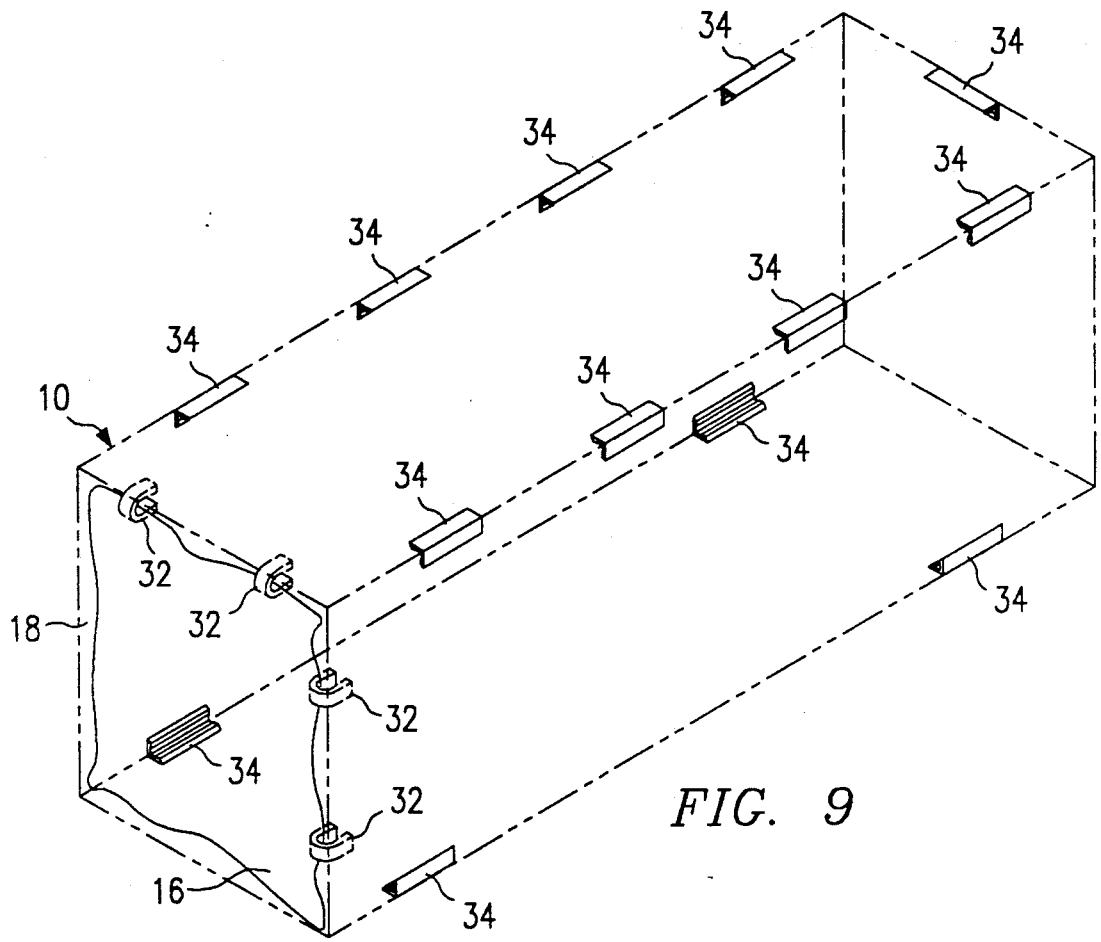
FIG. 9 illustrates the positioning of retaining members showing the container and the bag in phantom outline.

Referring now to FIG. 9, there is illustrated a phantom outline of a container 10 and the liner 16 installed therein. The retaining members 34 are disposed in the container such that they are in the upper corner thereof in the preferred embodiment. In the embodiment of FIG. 9, the retaining members 34 are disposed along the upper side corner of the container 10 with one retainer 34 disposed in the upper rear corner of the container 10. The retaining members 34 are disposed apart approximately four feet, such that for a forty foot container, there would be between nine to ten of the retaining members 34 disposed along each of the upper corners on each of the sides. However, the retaining members 34 can be dispersed apart greater distances, depending upon the weight of the bag and how tightly the bag must be maintained against the upper surface thereof.

Although not absolutely necessary, the retaining members 34 can also be placed on the lower corners of the installed liner 16. These are primarily utilized to prevent the liner 16 from shifting in the container 10. In the embodiment of FIG. 9, there are four retaining members 34 illustrated on the bottom of the container 10, two on each side thereof. Once the retaining members 34 are disposed therein and the liner 16 is secured thereto, the clips 32 can be removed and opening 18 closed-in somewhat to allow transport of the container 10 with the liner 16 secured to the walls thereof.

Figure 10:
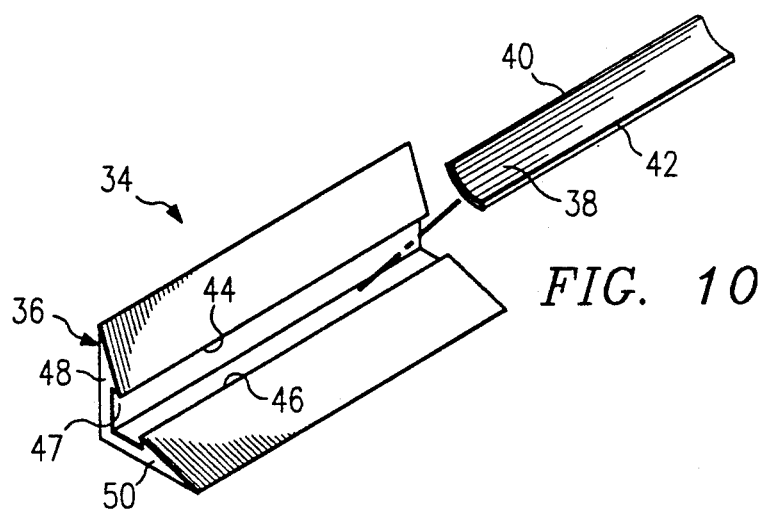
FIG. 10 illustrates an exploded view of the retaining bracket and the securing member.

Referring now to FIG. 10, there is illustrated an exploded view of the preferred embodiment of the retaining member 34. The retaining member 34 is comprised of two portions, a retaining bracket 36 and a securing bar 38. The securing bar 38 is fabricated from a flexible material formed in an elongated member having two parallel sides 40 and 42 and a concave shape therebetween. The sides 40 and 42 are operable to be flexed about the longitudinal axis of the securing bracket 38 to bring them closer together. The retaining bracket 34 has two parallel grooves 44 and 46 for receiving the parallel edges 40 and 42. A recess 47 is defined between the grooves 44 and 46. Although not illustrated in FIG. 10, the plastic liner 16 is operable to be disposed over the surface of the retaining bracket 36 and in the recess 47, and the securing bar 38 urged inward until the edges 40 and 42 are received by the grooves 44 and 46 with the liner 16 disposed therebetween.

Figure 11:
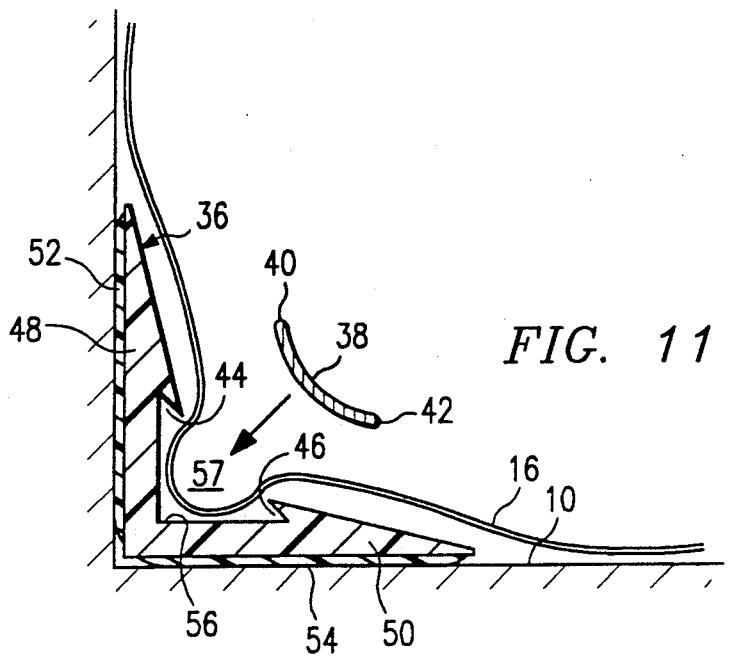
FIGS. 11-13 illustrate the steps of securing the liner between the retaining member and the securing bar.
Figure 12:
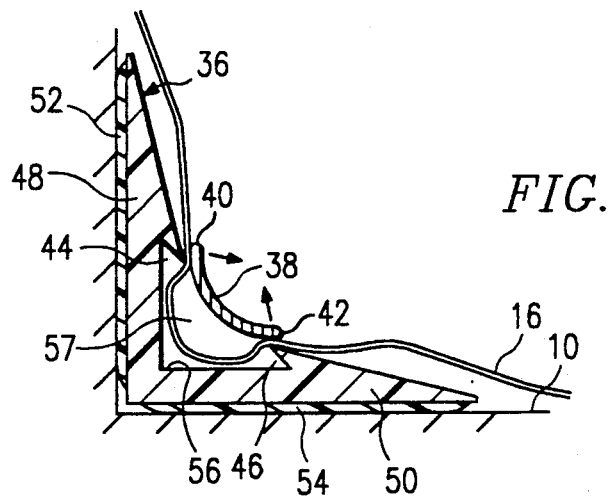
Figure 13:
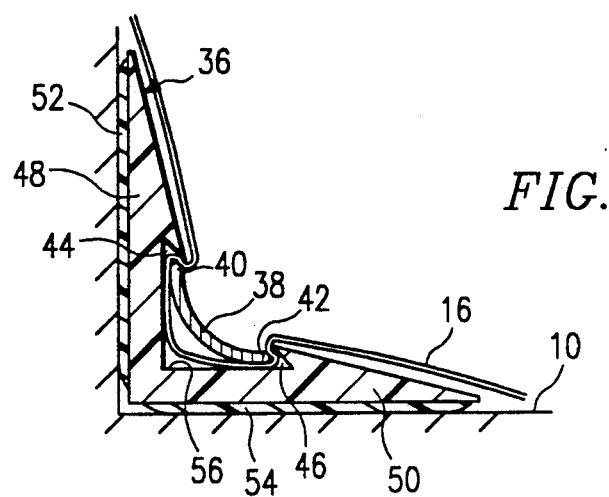

Referring now to FIGS. 11-13, the installation of the liner 16 between the securing bracket 36 and the securing bar 38 is illustrated. In FIG. 11, the securing bracket 36 is illustrated as being disposed in a corner of the container 10. The retaining bracket 36 is angular shaped, having two surfaces 48 and 50 disposed at a 90° angle with respect to each other. The groove 44 is disposed on the surface 48 and the groove 46 is disposed on the surface 50. A layer of adhesive 52 is disposed between the walls of the container 10 and the surface 48 and a layer of adhesive 54 is disposed between the surface of the container 10 and the surface 50.

Once the retaining bracket 36 has been disposed in the corner of container 10 and secured to the walls thereof, the liner 16 is installed such that it is in close contact with the retaining bracket 36. The space between the grooves 44 and 46 proceeds away from the plane formed thereby to an apex 56 in the recess 57. This recess 57 provides some "slack" for the liner 16. Thereafter, the securing bar 38 is pressed into the recess 57 between the grooves 44 and 46, thus forcing the liner 16 therein.

As illustrated in FIG. 12, each of the grooves 44 and 46 has an exterior apex 58 and an interior apex 60. The exterior apex 58 of the grooves 44 and 46 extend toward each other into the recess 57 and the interior apexes 60 are disposed a greater distance apart. The distance between the exterior apexes 58 of the grooves 44 and 46, respectively, provide a dimension that is less than the dimension between the parallel edges 40 and 42 of the securing bar 38 when the securing bar 38 is not flexed. Therefore, as illustrated in FIG. 12, when the securing bar 38 is pressed inward against the interior apexes 58 of the grooves 44 and 46, it must flex and hold the plastic liner 16 firmly thereagainst. As the securing bar 38 flexes, the dimension between the parallel edges 40 and 42 decreases to a dimension less than the distance between the exterior apexes 58 of grooves 44 and 46, thereby allowing the securing bar 38 to be pushed inward toward the apex 56 of recess 57. Once past the apexes 58, the securing bar 38 again returns to its original configuration such that the distance between the parallel edges 40 and 42 is greater than the distance between the apexes 58 of grooves 44 and 46 but slightly less than the distance between the interior apexes 60 of the grooves 44 and 46, respectively. This configuration is illustrated in FIG. 13. It can be seen that, in the unflexed state, the distance between the parallel edges 40 and 42 is sufficiently less than the distance between the interior apexes 60 of the grooves 44 and 46, respectively, such that there is some "play" to allow the securing bar 38 to freely move. Therefore, the edges of the liners 16 will not be pinched in the grooves 44 and 46, in addition to the fact that different thicknesses of liner 16 can be accommodated. It should be noted that pulling of the liner 16 outward from the recess 57 will not flex the securing bar 38, and therefore, there is a very secure attachment of the liner provided. The concave shape of the securing bar aids this attachment.

Figure 14:
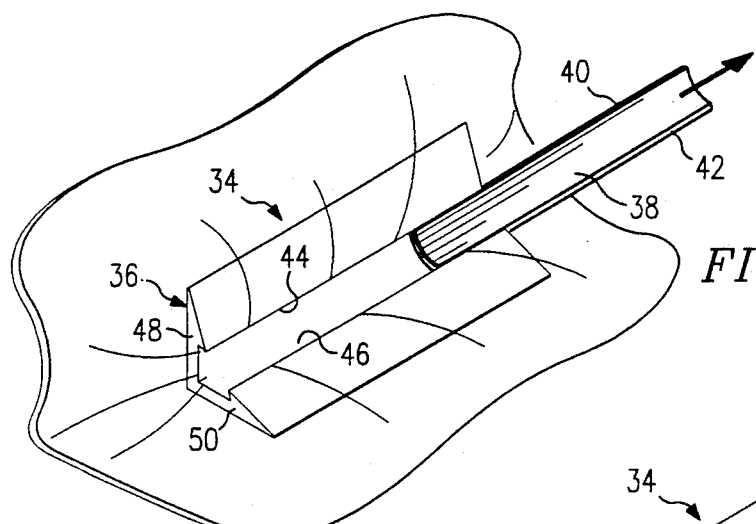
FIGS. 14 and 15 illustrate a method for removing the liner from the retaining member after securing thereof.

Referring now to FIG. 14, there is illustrated a method for removing the liner 16 for the retaining member 34 after securing therein. After the container 10 is unloaded and it is desirable to remove the liner 16, it is necessary to either remove the securing bar 38 from the retaining bracket 36 or to merely pull the plastic therefrom. In FIG. 14, the method of removing the securing bracket is illustrated. Since the grooves 44 and 46 are parallel and the sides 40 and 42 of the securing bar 38 are parallel, it is possible to slide the securing bar 38 outward from the retaining bracket 36. In so doing, the plastic liner 16 will then fall down.

Figure 15:
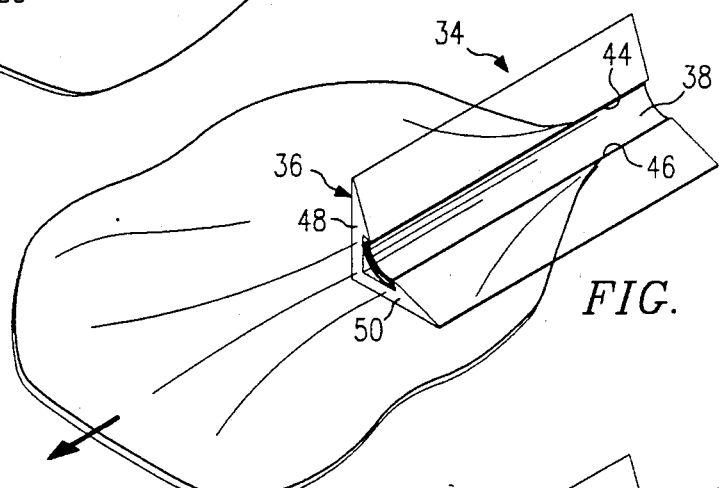

Referring now to FIG. 15, there is illustrated an alternate embodiment for removing the plastic liner 16 from the retaining member 34. In this illustration, the plastic liner 16 is merely pulled, which will result in tearing. By pulling in a sideward manner, the plastic liner will tear and will be removed from the space between the securing bar 38 and the retaining bracket 36.

In the preferred embodiment, the retaining bracket 36 is fabricated from a metal such as aluminum, such that it can be extruded. The securing bar 38 is also fabricated from aluminum to a thickness of approximately 0.20-0.30 inches. Therefore, the parallel edges 40 and 42 will be relatively sharp and will result in tearing of the liner 16 when it is moved sideways relative thereto or even pulled directly therefrom in a perpendicular manner. However, it should be understood that the retaining bracket 36 can be fabricated from such materials as polystyrene, polycarbonate, etc.

Figure 16:
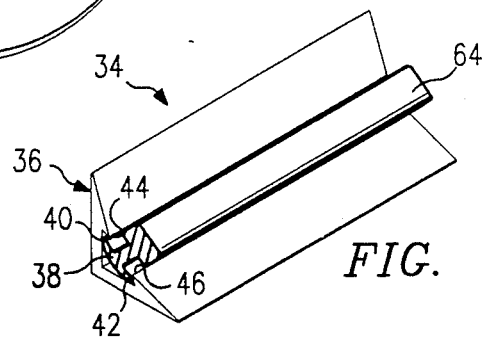
FIG. 16 illustrates an alternate embodiment of the retaining member and securing bar.

Referring now to FIG. 16, there is illustrated an alternate embodiment of the retaining member 34, and more particularly, the securing bar 38. The securing bar 38 has disposed on the outer surface thereof a longitudinal handle 64 that is formed on the surface of the securing bar 38. The handle 64 is operable to assist in forcing the securing bar 38 into a secured relationship with the grooves 34 and 36 and also assist in removing the securing bar 38 therefrom. It is only important that sufficient flexing be accommodated between the parallel edges 40 and 42 such that they can flex to a dimension that is less than the dimension between the exterior apexes 58 of grooves 44 and 46 as described above with respect to FIGS. 12-13.

Figure 17:
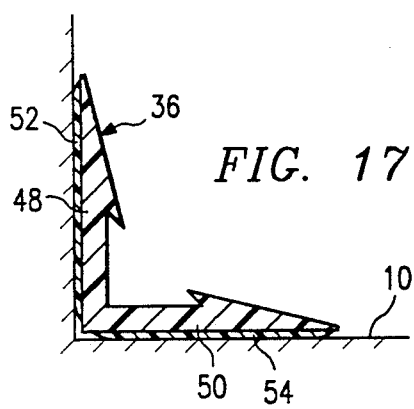
FIG. 17 illustrates one method for securing a retaining member against the walls of the container.

Referring now to FIG. 17, there is illustrated the preferred method for mounting the retaining bracket 36 in the corner of the container 10. Adhesive layers 52 and 56, described above, are applied to the exterior surfaces 48 and 50, respectively, of the retaining bracket 36. Once the adhesive layers 52 and 56 are applied, the retaining bracket 36 is then urged up into the corner after providing a preliminary cleaning to assure that loose dirt, etc. is minimized on the surface of the container 10 to which the retaining bracket 36 is to be secured. Force is applied to insure that there is adequate contact with the adhesive layers 52 and 56 and the container 10. In the preferred embodiment, the adhesive is a double sided tape manufactured by 3M Corporation under the model no. 4950, Double Coated Acrylic Foam Tape.

Figure 18:
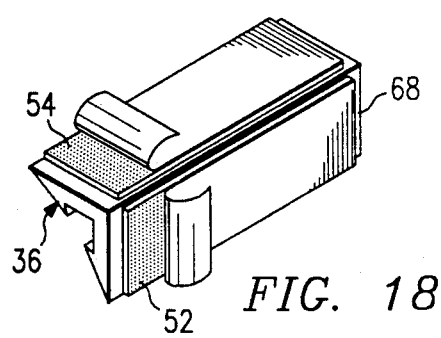
FIG. 18 illustrates the method by which the retaining member is shipped with an adhesive backing disposed thereon.

Referring now to FIG. 18, there is illustrated the method for shipping the retaining bracket 36 with the adhesive layers 52 and 56. Typically, the adhesive layers 52 and 56 are disposed on the surfaces 48 and 50 and then a layer of peel away material 68 disposed over the outer surface of the adhesive layer 52 and a layer of peel away material 70 disposed over the outer surface of the adhesive layer 54. It is then only necessary to pull away the peel away layers 68 and 70 to expose the outer surfaces of the adhesive layers 52 and 54 to allow installation thereof.

Figure 19:
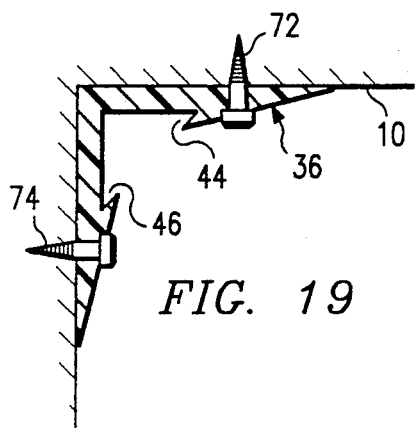
FIG. 19 illustrates an alternate embodiment of securing the retaining member on the walls of the container with bolts.

Referring now to FIG. 19, there is illustrated an alternate installation method for maintaining the retaining bracket 36. Rather than utilize the adhesive layers 52 and 54, the retaining bracket 36 is secured to the walls of the container 10 with bolts 72 and 74. The bolts 72 and 74 are disposed above grooves 44 and 46 and are disposed through the retaining bracket 36 and into the walls of the container 10. This is an installation procedure that is performed prior to inflating the liner 16. It should also be understood that the retaining bracket 36 can be integrally formed with the walls of the container 10. In the preferred embodiment, the retaining bracket 78 is approximately 3-5 inches in length. However, if the retaining bracket 36 were integrally formed with the walls of the container 10, it could run the entire length of the container 10 along the upper corners thereof. It would then only be necessary to provide securing bars in lengths of 3-5 inches for disposing at a number of points along the lengths of the securing bracket 36 when integrally formed with the walls of container 10.

Figure 20:
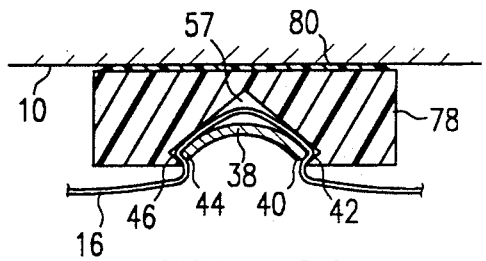
FIG. 20 illustrates an alternate installation method for the retaining member and securing bar for mounting on a flat surface.

Referring to FIG. 20, there is illustrated an alternate embodiment of the retaining bracket 36, illustrated as a retaining bracket 78. The retaining bracket 78 is essentially identical to the retaining bracket 36 with the exception that it is operable to be disposed on a flat surface as opposed to the corner. The retaining bracket 36 is adhesively secured to a flat surface of the container 10 with an adhesive layer 80. Other than this exception, the retaining bracket 78 functions identically to the retaining bracket 36. The retaining bracket 78 would be utilized in situations where there is a large span between corners to prevent unnecessary sagging.

Figure 21:
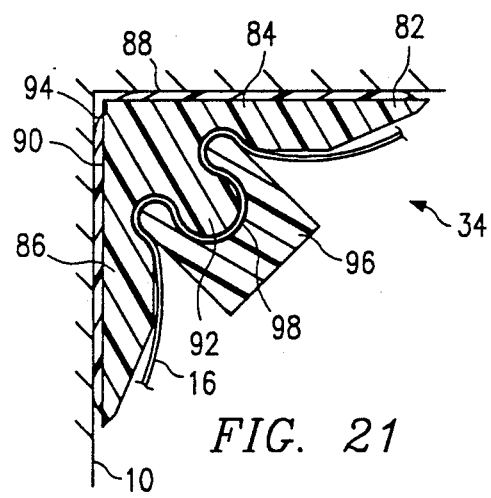
FIG. 21 illustrates an alternate embodiment of the retaining member and a securing bar.

Referring now to FIG. 21, there is illustrated yet another embodiment of the retaining bracket 36, referred to as retaining bracket 82. The retaining bracket 82 has two sides 84 and 86 extending at 90 angles with respect to each other. The exterior surface of the side 84 is adhered to the surface of the container 10 with adhesive layer 88, and the side 86 has the exterior surface thereof adhered to the surface of the container 10 with an adhesive layer 90, such that the retaining bracket 82 is disposed in a corner of the container 10. An outward protrusion 92 is provided that extends from an apex 94 at the intersection of the sides 84 and 86 and extends outward into the container 10 at a 45° angle with respect to the plates 84 and 86. The protrusion is dimensioned such that it tapers outward from the surface of the container 10 with the outwardmost end being spherical in shape with all surfaces of the protrusion being arcuate. A securing bar 96 is provided which has a recess 98 formed therein that is substantially similar in shape to the protrusion 92. The securing bar 96 is flexible such that it can be pushed down over the protrusion 92 with the peripheral edges of the recess 98 at the outermost edges thereof flexing outward and over the protrusion 92. The liner 16 is disposed therebetween.

Figure 22:
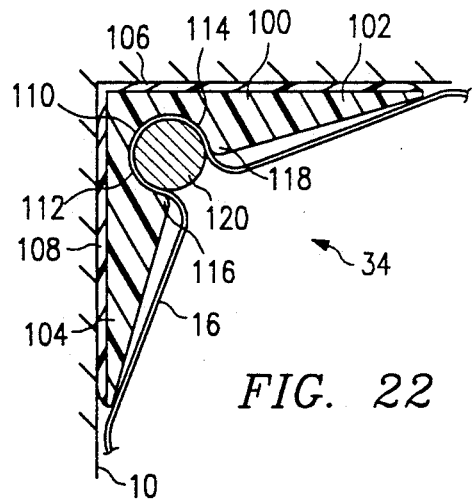
FIG. 22 illustrates yet another alternate embodiment of the retaining member and securing bar.

Referring now to FIG. 22 there is illustrated yet another embodiment of the retaining member 34. A retaining bracket 100 is provided which is comprised of two sides, 102 and 104 disposed at 90° angles with respect to each other. The exterior surface of the side 102 is adhered by adhesive layer 106 to the exterior surface of the container 10 and the exterior surface of the side 104 is adhered to the exterior surface of the container 10, the bracket 100 being configured such that it is disposed in the corner of the container 10.

The retaining bracket 100 has an arcuate recess 110 formed therein. The recess 110 is configured such that it has an interior dimension between points 112 and 114 that is greater than the outermost edges 116 and 118. Essentially, the recess 110 has an angular dimension that covers greater than 180°. The retaining bracket 100 is fabricated from a pliable material that easily compresses such that the dimension between the points 116 and 118 can increase. This can either be a polypropolene material or rubber.

A retaining rod 120 is provided which is operable to be disposed in the recess 110. The diameter of the rod 120 is greater than the distance between the points 116 and 118 but less than the distance between the points 112 and 114. Therefore, when the retaining rod 120 is urged inward into the recess 110, the portion of the retaining bracket 100 proximate to the points 114 and 116 compresses, thereby allowing the rod 120 to be inserted into the recess 110. The plastic liner 16 is disposed between the retaining rod 120 and the recess 110 such that it is held therein.

Figure 23:
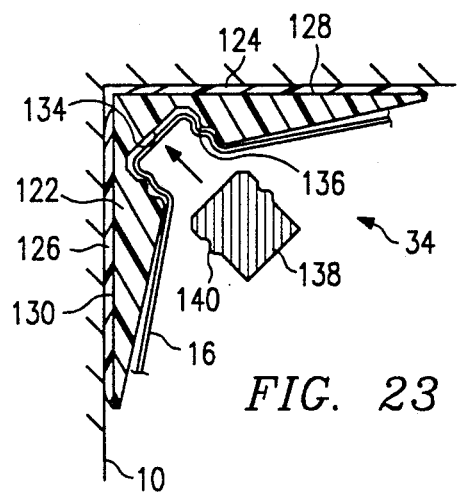
FIGS. 23 and 24 illustrate a further embodiment of the securing member and retaining bar.
Figure 24:
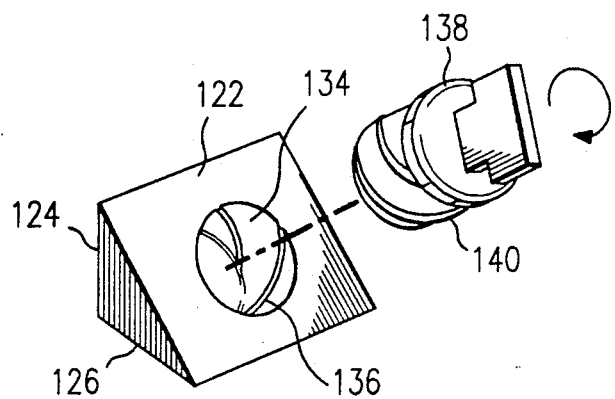

Referring now to FIGS. 23 and 24, there is illustrated a yet further alternate embodiment for the retaining member 34. A retaining bracket 122 is provided which is triangular shaped and operable to be disposed in the corner of the container 10. There are two exterior surfaces 124 and 126 provided that have adhesive layers 128 and 130, respectively, disposed thereon. The adhesive layers 128 and 130 are operable to be forced against the walls of the container 10 proximate to the corner thereof to adhere the retaining bracket 122 in the container 10. The other surface of the triangular shaped retaining bracket 122 has a circular or cylindrical recess 132 formed therein. The cylindrical recess 134 has threaded regions 136 disposed on the sides thereof. A securing insert 138 is provided which has mating threaded regions 140 disposed on the cylindrical surfaces thereof. The securing insert 138 is then threadedly engaged with the cylindrical recess 134 with the liner 16 disposed therebetween. The threaded engagement between threads 136 and 140 is such that only approximately one-half to three-quarters of a turn is required to provide a secured relationship between the two.

Figure 26:
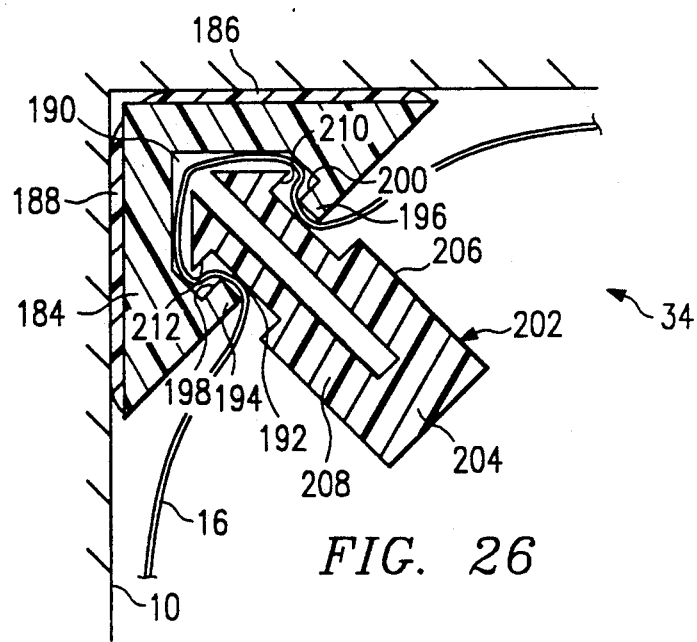

Referring now to FIG. 26, there is illustrated an alternate embodiment of the retaining member 34. A retaining bracket 144 is provided having a first side 146 and a second side 148 that are perpendicular to each other. The exterior surface of the side 146 is adhered to one side of the container 10 in the corner thereof by an adhesive layer 150. In a similar manner, the exterior surface of side 148 is adhered to the surface of the container 10 by adhesive layer 152 in the corner thereof. The retaining bracket 144 has an outward protrusion 154 oriented such that it extends outward at a 45° angle from the apex of the corner of the container 10. The outermost end of the protrusion 154 has a triangular shaped head having an ear 156 and an ear 158 disposed on diametrically opposite sides thereof. Each of the ears 156 and 158 have a flat surface facing the corner of container 10 and an exterior tapered surface extending from the outermost end of each of the ears 156 and 158 inward to an apex 160. The flat surfaces of the ears 156 and 158 provide a retaining surface.

A securing member 162 is comprised of a body 164 and two flexible retaining legs 166 and 168. Each of the flexible legs 166 and 168 extend downward from the body 164 from attachment points 170 and 172. A portion of the body 164 extends along the length of the flexible legs 166 and 168 to form a space therebetween. This space allows the flexible legs 166 and 168 to flex inward thereto. Protrusions 174 and 176 are provided on the innermost portion of the body extending parallel to the flexible legs 166 and 168 and outward therefrom toward the flexible legs 166 and 168. The flexible legs 166 and 168 are operable to contact the protrusions 174 and 176 when pressed inward thereto. In operation, if pressure is applied to the flexible legs 166 and 168 at a point between the protrusions 174 and 176 and the attachment points 170 and 172, the most distal ends of the flexible legs 166 and 168 flex outward.

The distal ends of each of the legs 166 and 168 have a retaining surface disposed on the end thereof referred to by reference numerals 178 and 180, respectively. The retaining surfaces are directed inward to the flat surfaces of ears 156 and 158, respectively to be placed in contact therewith. The end the inwardmost portion of flat surfaces to the most distal end of the flexible arms 166 and 168.

In operation, the flexible liner 16 is disposed over the protrusion 154 and then the securing member 162 pressed thereover. The flexible arms 166 and 168 are forced outward at the ends thereof as a result of the interaction of the tapered surfaces on the end thereof and the tapered outer surface of the protrusion 154. When the surfaces 178 and 180 are pressed past the ears 158 and 156, the flexible arms 166 and 168 flex inward and provide a secured attachment. To remove the securing member 162, it is only necessary to place inward pressure on the exterior surface of the flexible legs 166 and 168 at a point between the attachment points 170 and 172 and the protrusions 174 and 176.

Figure 25:
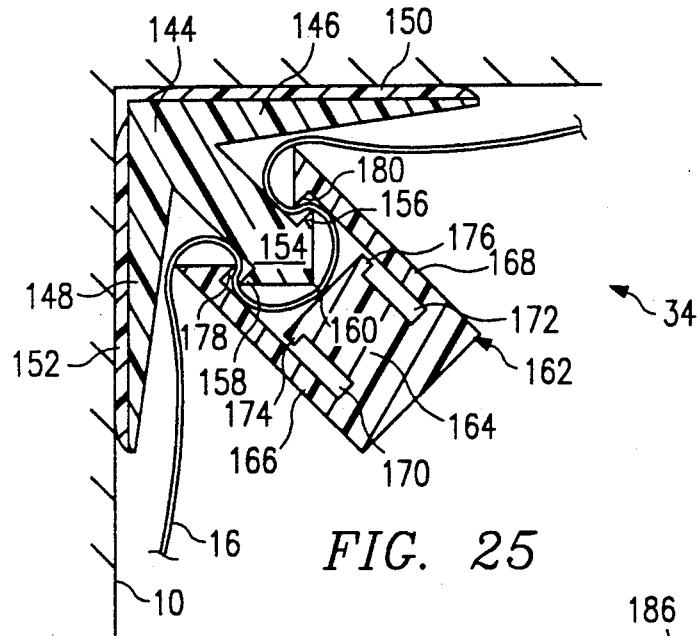
FIGS. 25 and 26 illustrate a yet further embodiment of the securing member and retaining bar.

Referring now to FIG. 25, there is illustrated an alternate embodiment of the securing member 34. A triangular shaped retaining bracket 184 is provided which has two securing surfaces and an outer surface. The two securing surfaces are operable to be adhered to the corner of the container 10 by an adhesive layer 186 and an adhesive layer 188. A recess 190 is provided in the outer surface of the retaining bracket 184 that has an opening 192 and two protrusions 194 and 196 that extend inward to the recess 190. The protrusions 194 and 196 provide flat surfaces 198 and 200 on the diametrically opposite side of to the outer surface of the retaining bracket 184.

A securing member 202 is provided having a body 204 with two flexible legs 206 and 208 extending downward therefrom in a parallel manner. Each of the flexible legs 206 and 208 has disposed on the end thereof a retaining surface 210 that is directed perpendicular to the respective flexible leg 206 or 208 and directed outward from the central axis thereof and operable to coact with the respective one of the flat surfaces 198 or 200. The outer surface of the flexible legs 206 and 208 is tapered from the most distal point thereof extending outward to the respective flat surface 210

In operation, the retaining bracket 184 is adhered to the corner of the container 10 and then the liner 16 disposed over the recess 190 at the opening 192. The securing member 202 is inserted into the opening 192 such that the distal ends of the flexible legs 206 and 208 are forced therein. The liner 16 is then forced into the recess 190 the flexible legs 206 and 208 forced inward on the distal ends thereof such that the outermost ends of the flat surfaces 210 flex inward to allow passage through the opening 192. Once in the recess 190, the flexible legs 206 and 208 flex outward such that the flat surfaces 210 contact with the flat surfaces 198 and 200 to prevent withdrawal thereof. To withdraw the securing member 202, it is only necessary to place pressure on the exterior surfaces of the flexible legs 206 and 208 to force them inward.

Although the preferred embodiment has been described in detail, it should be understood that various changes, substitutions and alterations can be made therein without departing from the spirit and scope of the invention as defined by the appended claims.

In summary, there has been provided a method and apparatus for installing and securing a liner in a container, which lined container can be transported and loaded at a different location. A retaining member is comprised of two portions, a first portion for being secured to the walls of the container and a second portion for being inserted into the retaining bracket after the liner has been installed. The liner is installed by a vacuum process wherein the opening of the liner is sealed around the peripheral edge of the container and then a vacuum pulled between the exterior surface of the liner and the interior surface of the container, such that the exterior surface of the liner is pulled outward toward the interior surface of the container. Once the liner is forced against the interior surface of the container, the second portion of the retaining member is inserted into the secured retaining bracket and the vacuum removed. This allows the liner to remain in a position such that loading can be performed at a different location.

What is claimed is:

1. A method for installing a liner in a container defining an enclosed space and having at least one open end and interior walls, the liner defining an enclosed space substantially shaped like the container and the liner having at least one open end and an interior and exterior surface, comprising the steps of:
   providing a plurality of interlocking devices, each interlocking device having first and second interlocking sections operable to be mated together in a locking configuration;
   disposing the first interlocking sections on the interior walls of the container at select locations;
   inserting the liner into the container opening such that the at least one opening in the liner is proximate the opening in the container;
   urging the exterior surface of the liner outward and against the interior walls of the container and over the first interlocking sections; and
   interlocking the second interlocking sections with the corresponding ones of the first interlocking sections from the interior surface of the liner such that portions of the liner are disposed therebetween and not punctured when the first and second interlocking sections are in the locking configuration such that the liner is maintained proximate to the interior walls of the container.

2. The method of claim 1 wherein the container is rectangular-shaped and the first interlocking sections are disposed in the upper corners thereof at the select locations.

3. The method of claim 2 and further comprising disposing ones of the first interlocking sections in the lower corners of the container at select locations.

4. The method of claim 1 wherein the first interlocking sections are integral with the container and integrally formed at the select locations on the interior walls of the container.

5. The method of claim 1 wherein the first interlocking sections are secured to the interior walls of the container by an adhesive material.

6. The method of claim 1 wherein the first interlocking sections are secured to the interior walls of the container by bolts.

7. The method of claim 1 wherein the first and second interlocking sections are male and female interlocking sections wherein male sections are inserted into female sections with a predetermined force and the force to remove the male sections from the female sections is greater than that required for insertion thereof.

8. The method of claim 1 wherein the step of urging the exterior surface of the liner outward comprises the steps of:
   substantially sealing at least the peripheral edges of the at least one opening in the liner proximate to the peripheral edges of the opening in the container to define an interior space between the interior walls of the container and the exterior surface of the liner;
   providing a passageway between the interior space and the exterior of the container;
   creating a negative pressure on the exterior of the passageway such that a low pressure area is formed within the interior space;
   maintaining the low pressure on the exterior passageway until the exterior surface of the liner is proximate to the interior sides of the container; and
   removing the low pressure after the step of interlocking the first and second sections.

9. The method of claim 1 and further comprising:
   moving the container with the secured liner therein to a different location;
   loading the container with the secured liner therein with cargo; and
   closing the at least one opening in the liner about the cargo.

10. The method of claim 9 wherein the container is rectangular-shaped and the opening therein is formed on a vertical side of the container such that cargo is loaded on a substantially horizontal plane.

11. A method for installing a liner in a container defining an enclosed space and having at least one open end and interior walls, the liner defining an enclosed space substantially shaped like the container and the liner having at least one open end and an interior and exterior surface, comprising the steps of:
   disposing one side of at least one of a plurality of male/female interlocking devices on the interior walls of the container at a select location;
   inserting the liner into the container opening such that the at least one opening in the liner is proximate to the opening in the container;
   sealing the peripheral edges of the at least one opening in the liner proximate to the peripheral edges of the opening in the container to define an interior space between the interior walls of the container and the exterior surface of the liner;
   providing a passageway between the interior space and the exterior of the container;
   drawing air through a passageway to the exterior to create a vacuum in the interior space to urge the exterior surfaces of the liner proximate to the walls of the container;
   interlocking the other side of the at least one male/female interlocking device from the interior side of the liner to the one side thereof disposed on the interior wall of the container such that the other side of the at least one male/female interlocking device is placed into a locking configuration with the one side of the at least one male/female interlocking device with the liner disposed therebetween and not punctured such that the liner can be maintained proximate to the interior walls of the container when the vacuum is removed from the interior space; and
   discontinuing air flow through the passage such that the vacuum is removed from between the exterior surface of the liner and the interior sides of the container.

12. The method of claim 11 wherein the container is rectangular in shape and the one side of the male/female interlocking devices disposed in select locations in the upper corners of the container.

13. The method of claim 11 wherein a plurality of male/female interlocking devices are utilized and disposed at select locations in the container on the interior walls thereof.

14. The method of claim 12 wherein the one side of each of the male/female interlocking devices are disposed in the upper corners of the container on the interior walls thereof.

15. The method of claim 14 wherein a plurality of the one sides of the male/female interlocking devices are disposed in the lower corners of the container on the interior thereof.

16. The method of claim 11 wherein the one sides of the male/female interlocking device are secured to the interior walls of the container by a layer of adhesive.

17. The method of claim 11 wherein the container with the liner disposed therein is moved to a different location than where the liner was secured thereto and the container then loaded with cargo, the at least one opening in the liner closed down over the cargo loaded in the container.

* * * * *